United States Patent [19]

Lee

[11] Patent Number: 5,121,983
[45] Date of Patent: Jun. 16, 1992

[54] STEREOSCOPIC PROJECTOR

[75] Inventor: Dong H. Lee, Seoul, Rep. of Korea

[73] Assignee: Goldstar Co., Ltd., Seoul, Rep. of Korea

[21] Appl. No.: 626,550

[22] Filed: Dec. 12, 1990

[30] Foreign Application Priority Data

Dec. 14, 1989 [KR] Rep. of Korea ............... 18564/1989

[51] Int. Cl.⁵ .............................................. G02B 27/26
[52] U.S. Cl. ............................................. 353/8; 353/20; 353/30; 359/464
[58] Field of Search ..................... 353/8, 7, 20, 30, 33, 353/82, 94, 31, 32, 102, 81, 34; 350/132, 130; 358/88, 3; 359/464, 465, 471, 475

[56] References Cited

U.S. PATENT DOCUMENTS

| | | | |
|---|---|---|---|
| 2,212,880 | 8/1940 | Land | 353/8 |
| 2,672,786 | 3/1954 | Capstaff | 353/33 |
| 2,958,258 | 11/1960 | Kelly | 353/20 |
| 4,256,368 | 3/1981 | Task | 353/20 |
| 4,295,153 | 10/1981 | Gibson | 350/132 |
| 4,345,258 | 8/1982 | Tsai et al. | 353/20 |
| 4,480,893 | 11/1984 | Fantone | 353/8 |
| 4,647,966 | 3/1987 | Phillips et al. | 350/331 R |
| 4,786,146 | 11/1988 | Ledebuhr | 353/20 |
| 4,943,154 | 7/1990 | Miyatake et al. | 353/31 |
| 4,969,730 | 11/1990 | VandenBrandt | 353/30 |
| 4,969,731 | 11/1990 | Ogino et al. | 353/31 |
| 5,060,058 | 10/1991 | Goldenberg et al. | 353/34 |

FOREIGN PATENT DOCUMENTS 0181138  7/1990  Japan ..................................... 353/8

Primary Examiner—William A. Cuchlinski, Jr.
Assistant Examiner—William C. Dowling
Attorney, Agent, or Firm—Birch, Stewart, Kolasch & Birch

[57] ABSTRACT

A stereoscopic projector includes a condenser member for leading a beam from a lamp to advance in parallel, an infrared ray filter for removing heat component in the beam from the condenser system, a polarizing beam splitter for splitting an incident beam into two beams, a liquid crystal display panel or a slide film for obtaining image signals, and a reflective mirror for converting the beam path a field lens and a projection lens, whereby the projector prevents the keystoning phenomenon, since the light utilizing efficiency is high, the power loss is reduced, and the infrared filter removes the thermal line from the beam so that the separate cooling system is not required.

6 Claims, 3 Drawing Sheets

STEREOSCOPIC PROJECTOR

BACKGROUND OF THE INVENTION

1. Field of the Invention

The present invention relates to a stereoscopic projector for enhancing the using efficiency of the beam from a light source and removing a keystoning phenomenon that a picture is distorted on a screen to prevent the eye-strain of viewers.

2. Description of the Prior Art

Various types of stereoscopic projectors are well known in the art. Such stereoscopic projectors include two projectors arranged in parallel so that image from a liquid crystal display (hereinafter "LCD") panel or a slide film is projected on a screen by each light source. As shown in FIG. 1, one of such stereoscopic projectors comprises spherical reflective mirrors 1 and 1', lamps 2 and 2', condenser members 3 and 3', LCD panels 4 and 4', and projection lenses 5 and 5'.

In the conventional stereoscopic projector, the stereoscopic picture is obtained by making the polarizing directions of projected beams perpendicular to each other by using two projectors, and then the picture from a right projector is watched only with right eye of a viewer and the picture from a left projector is watched only with left eye of a viewer, respectively.

In the conventional projector, the lamps 2 and 2' are independently operated and when the beams from the lamps 2 and 2' pass through the LCD panels 4 and 4', the beams are polarized in the direction of a polarizing axis of polarizing plates 41 attached to the LCD panels 4 and 4'. At this time, a half of the beams condensed by the condenser members 3 and 3' is decreased before having passed through the LCD panels 4 and 4' by one polarizing plate 41 which is located at the light source side. A loss of light occurs due to a part of light being absorbed as a heat to the polarizing plate 41 of the light source side, thereby necessitating a separate cooling device to increase the cooling efficiency at the LCD panels 4 and 4'.

Furthermore, the conventional projector involves another problems that a keystoning phenomenon that two pictures are distorted, is produced when projecting an image on the screen 6 on account of using two projectors and resulting in eyestrain of viewers, and it also requires a complicated projection lens driving system to make two pictures accord to each other.

SUMMARY OF THE INVENTION

Accordingly, it is an object of the present invention to provide a stereoscopic projector for overcoming such problems encountered in the conventional projectors.

Another object of the present invention is to provide a stereoscopic projector which comprises a condenser member for inducing a beam emitted from a lamp to advance in parallel, an infrared ray cut filter for removing heat component in the beam emitted from the condenser member, a polarizing beam splitter for splitting an incident beam into two polarizing beams of which the polarizing directions are different from each other, an LCD panel or a slide film for obtaining image signals, a reflective mirror for converting the beam path, a field lens, and a projection lens.

A further object of the present invention is to provide a stereoscopic projector having a condenser member which comprises a lamp, a non-spherical reflective mirror or a paraboloidal mirror mounted at the rear side of the lamp for inducing the beam directed backward among the beams emitted from the lamp to advance forward, a beam guide unit for inducing the beam directed forward to advance in parallel, and a reflective mirror member including one or more ringular band-type spherical mirrors. Also the projector has a polarizing beam splitter which comprises two sheets of triangular prisms attached to each other at the slant surfaces thereof and a coating layer for splitting the incident beam into beams having the polarizing directions which are perpendicular to each other.

Still another object of the present invention is to provide an improved projector for obtaining stereoscopic pictures and dissimilar to the conventional system using two projections so that the keystoning phenomenon does not occur and since the majority of the beam from a light source is utilized, the loss of power can be reduced. In addition, the projector of the present invention is simple in construction and inexpensive to manufacture, and easy in use, whereas the conventional system requires a complicated projection lens driving system to make the pictures projected on the screen from two projectors accord to each other.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a stereoscopic projector includes a condenser member for leading a beam from a lamp to advance in parallel, an infrared ray filter for removing heat component in the beam from the condenser system, a polarizing beam splitter for splitting an incident beam into two beams, a liquid crystal display panel or a slide film for obtaining image signals, and a reflective mirror for converting the beam path a field lens and a projection lens, whereby the projector prevents the keystoning phenomenon, since the light utilized efficiency is high, the power loss is reduced, and the infrared filter removes the thermal line from the beam so that the separate cooling system is not required.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
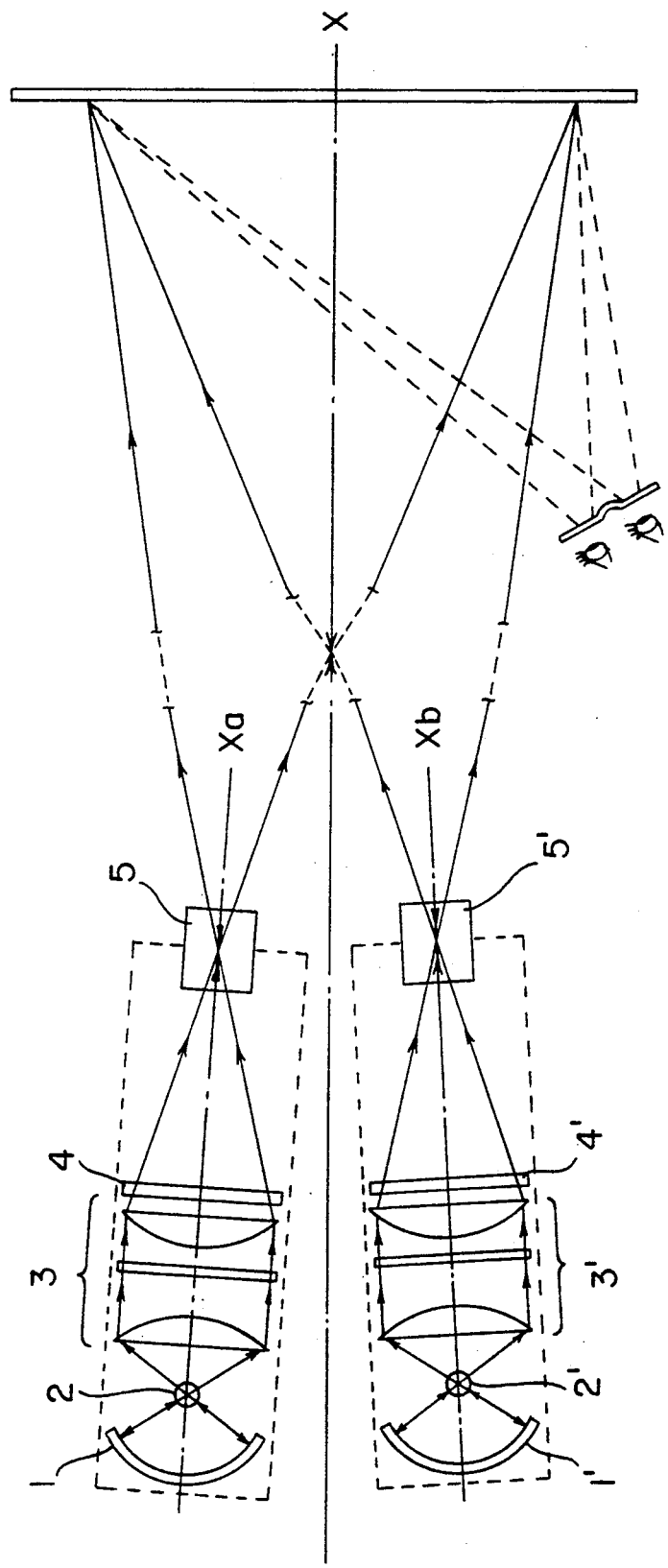
FIG. 1 illustrates the configuration of a conventional stereoscopic projector.
Figure 2:
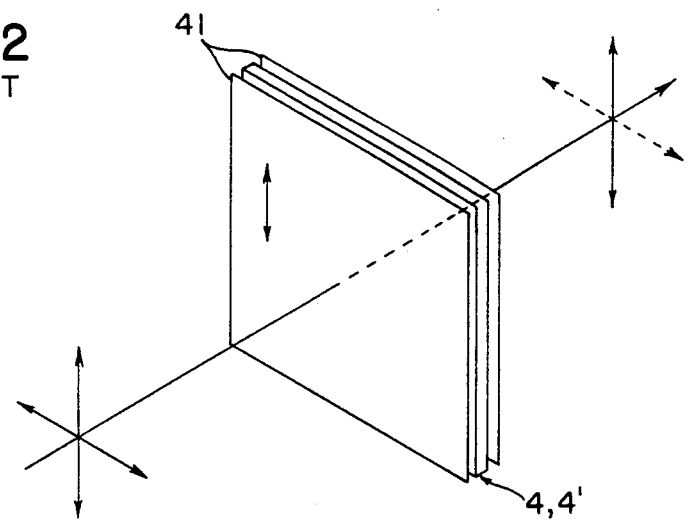
FIG. 2 illustrates an LCD panel of FIG. 1.
Figure 3:
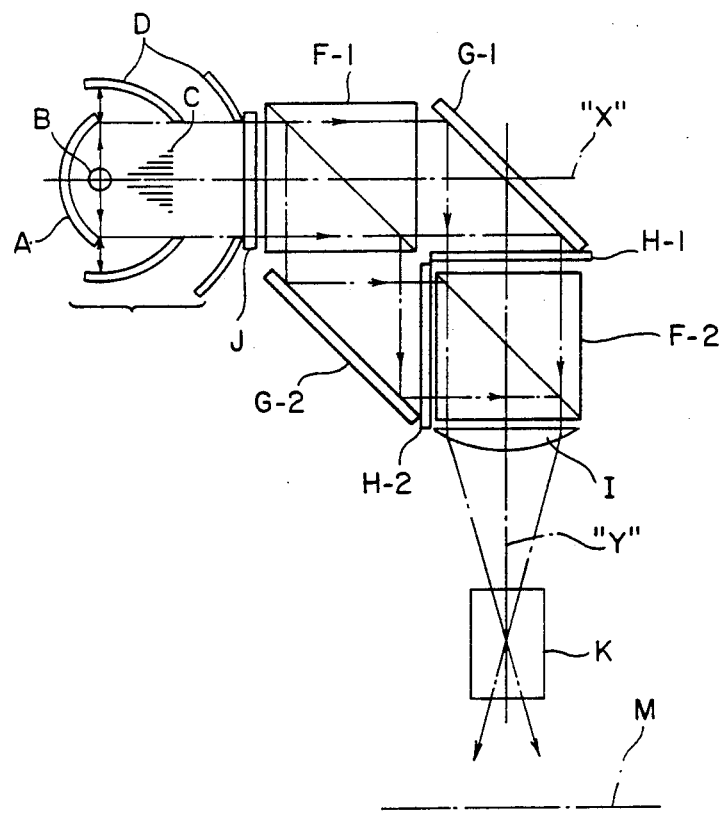
FIG. 3 illustrates the configuration of a stereoscopic projector of the present invention.

Referring now in detail to the drawings for the purpose of illustrating preferred embodiments of the present invention, the stereoscopic projector according to a first embodiment of the present invention as shown in FIG. 3 comprises a condenser member E including a non-spherical reflective mirror A, a light source member B such as a lamp, a beam guide unit C, and a reflective mirror D having one or more ringular band-type spherical mirrors, first and second polarizing beam splitters F-1 and F-2, first and second sheets of mirrors G-I and G-2 for bending the path of beam at an angle of 90°, first and second sheets of LCD panels H-1 and H-2, a field lens I, an infrared cut filter J, and a projection lens K. The non-spherical reflective mirror A is designed such that it has an angle range of about $2\pi$ (Steradian unit) from the light source and the beams emitted backward form the light source advance forward in parallel (FIG. 3). The reflective mirror D is adapted to lead the beams emitted forward in a ringular band-type from the light source to advance forward the light source and comprises a plurality of ringular band-type spherical mirrors each of which the center of curvature is in line with the center of the light source (FIG. 3). The beam guide unit C is arranged in front of the light source Band adapted to allow the beams advancing in parallel to the optical axis to pass therethrough among the beams emitted from the non-spherical reflective mirror and the light source (FIG. 3). The beam guide unit C is in axis-symmetrical with the optical axis and comprises a plurality of cylinder structures each of which the radius is gradually increased.

Figure 4:
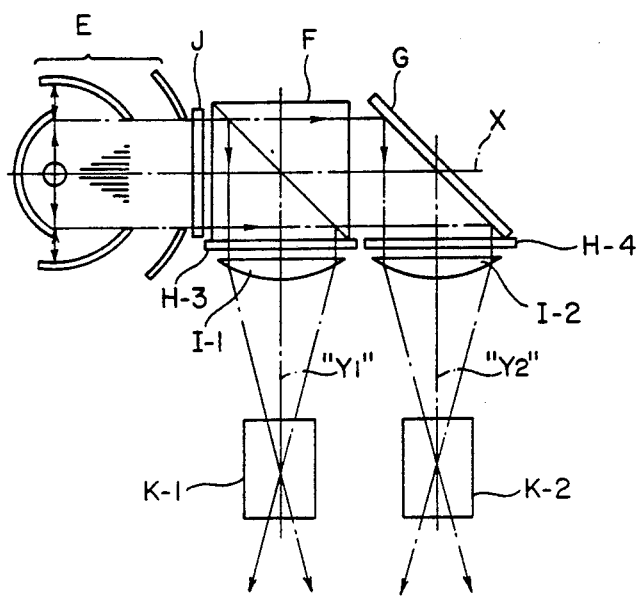
FIG. 4 illustrates the configuration of a stereoscopic projector of second embodiment of the present invention.
Figure 5:
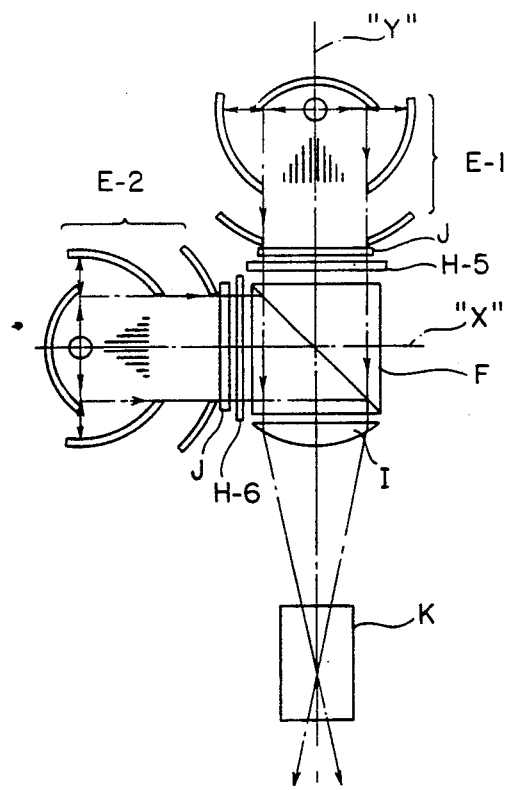
FIG. 5 illustrates the configuration of a stereoscopic projector of third embodiment of the present invention.
Figure 6:
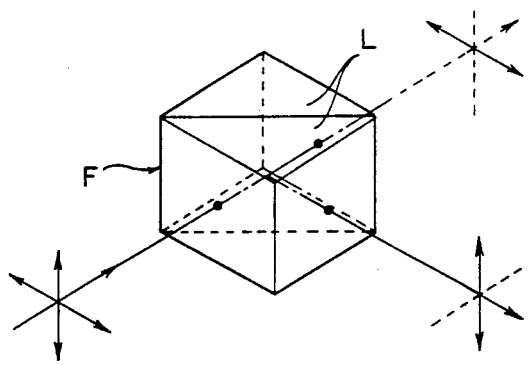
FIG. 6 illustrates a polarizing beam splitter of the projector of the present invention.

The condenser member E and the first polarizing beam splitter F-1 are arranged in the same line X and a beam emitted from the light source system B is splitted by the first polarizing beam splitter F-1 and then advances straightly or at a right angle after having been bent. The condenser member E including the above-mentioned members enables the use of beams more than that of conventional condenser system and is also capable of obtaining more efficiently the parallel beam in relation to the transmittivity of LCD panel (FIGS. 4 and 5). The field lens I is provided with the parallel beam produced and considering fully the LCD characteristic with respect to the variation of light-transmittivity ratio of an LCD panel, and then allowed to pass through the LCD panel and thereafter focused o the projection lens K by means of the field lens I. That is, the field lens I is used to avoid the deterioration of image quality which may occur due to the variation of the light-transmittivity ratio of LCD depending upon the angle of incidence (FIGS. 3 and 5).

The second polarizing beam splitter F-2, the field lens I, and the projection lens k are arranged on the line Y which crosses the line X at a right angle, the first and second LCD panels H-1 and H-2 are arranged adjacent to the rear and left sides of the second polarizing beam splitter F-2, the first mirror G-1 is arranged at the rear side of the first LCD panel H-1, and the second mirror G-2 is arranged at the left side of the second LCD panel H-2.

The first mirror G-1 reflects a beam which advances straightly after having been splitted at the first polarizing beam splitter F-1 toward the second polarizing beam splitter F-2 through the first LCD panel H-1, and the second mirror G-2 reflects a beam which advances at a right angle after having been splitted at the first polarizing beam splitter F-1 toward the second polarizing beam splitter F-2 through the second LCD panel H-2.

The polarizing beam splitter F is structured with two right-angled prisms L, for example, BK7: bolo silicate 7 glass which are bonded with their slant surfaces, and a special multilayer dielectric film is formed on the attaching surfaces. The coating layer is formed by coating a special dielectric film at a Brewster's angle or a polarizing angle with respect to an incident beam.

Accordingly, when a non-polarizing beam is incident upon an incident surface of the polarizing beam splitter F at a right angle, the incident beam is splitted into a S-polarized light and a P-polarized light of which the advancing directions are perpendicular to each other, and the splitting rate is over 97%. And, the P-polarizing component in the incident beam passes directly through the polarizing beam splitter F without any reflection, while the S-polarizing component is partially reflected at each layer of the multilayer dielectric film coating layer and as a gap between the multilayer coating layer is formed to meet the resonance condition, the partial reflective beam is reinforced and overlapped when reflected and then comes out at a right angle with respect to the incident direction.

In addition, since the thickness of the multilayer dielectric film coating layer is about several wavelength, there is no problem on the ghost image.

The stereoscopic projector of the present invention operates as follows.

When beams are emitted from a light source, they are advanced in parallel to an optical axis while passing through a non-spherical reflective mirror A, a reflective mirror D, and a beam guide unit C. After passing through an infrared cut filter J thermal lines are removed and then splitted into two polarized beams whose polarizing directions are perpendicular to each other at the first polarizing beam splitter F-1. These polarizing beams pass through the first and second LCD panels H-1 and H-2 after having been bent by the first mirror G-1 and the second mirror G-2, thereby obtaining left and right image signals. The polarizing beams processed as above pass again through the second polarizing beam splitter F-2 and then the advancing paths thereof accord with each other and pass through in parallel the projection lens K via the field lens I. Thereafter, the left and right video signals are projected on a screen M by the two polarizing beams whose polarizing directions are perpendicular to each other so that viewers can feel the stereoscopic image by using a polarizing optical.

According to a first embodiment of the present invention as described above, since the stereoscopic projector uses one light source and one projection lens, it is possible to make the product simple in structure and light in weight.

Referring to FIG. 4, the stereoscopic projector according to a second embodiment of the present invention comprises a condenser member E, one polarizing beam splitter F, one reflective mirror G, third and fourth LCD panels H-3 and H-4 or slide films, first and second field lenses I-1 and I-2, and first and second projection lenses K-1 and K-2.

The condenser member E, the polarizing beam splitter F and the reflective mirror G are arranged on the line X, the third LCD panel H-3, the first field lens I-1 and the first projection lens K-1 are arranged on the line Y1 which crosses perpendicularly the line X, and with a predetermined distance the fourth LCD panel H-4, the second field lens I-2 and the second projection lens K-2 are arranged on the line Y2 which crosses perpendicularly the line X.

In the second embodiment, the beam emitted from the condenser member E is splitted by the polarizing beam splitter F and advances directly forward or at a right angle after having been bent. The beam which has been bent passes through the third LCD panel H-3, the first field lens I-1 and the first projection lens K-1, and the directly advancing beam is bent at a right angle by the reflective mirror G and then pass through the fourth LCD panel H-4, the second field lens I-2, and the second projection lens K-2.

As shown in FIG. 5, the stereoscopic projector according to a third embodiment of the present invention comprises first and second condenser member E-1 and E-2, fifth and sixth LCD panels H-5 and H-6, one polarizing beam splitter F, one field lens I and one projection lens K.

The first condenser member E-1, the polarizing beam splitter F, the field lens I and the projection lens K are arranged on the line Y, and the second condenser member E-2 and the sixth LCD panel E-6 are arranged on the line X which crosses the line Y at a right angle.

In the third embodiment, the transmitted component of the beam emitted from the first condenser member E-1 advances forward directly through the fifth LCD panel H-5 and the polarizing beam splitter F and the reflected component of passes through the field lens I and projection lens K and the beam emitted from the second condenser system E-2 passes through the sixth LCD panel H-6 and then bent at a right angle by the polarizing beam splitter F and also passes through the field lens I and projection lens K. But, a beam of light consisting of the reflected component from the first condenser member E-1 and the transmitted component from the second condenser member E-2 in FIG. 5 to pass through the polarizing beam splitter F along the path x is gone into discard.

According to the above respective embodiments, it is possible to construct a stereoscopic projector which does not require a complicated projection lens driving unit. And, since almost 100% of the beam from the light source is utilized, the power loss is reduced. In addition, the thermal line is removed before the beam having been incident upon the LCD panel so that a separate cooling system is not required. Furthermore, the keystoning phenomenon that is a distortion on the screen does not occur, thereby preventing the eyestrain of viewers. The present invention described above is applicable not only to an LCD projector but to a slide projector.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A stereoscopic projector comprising:
   a condenser member for leading a beam from a light source to advance in parallel to an optical axis thereof, said condenser member including:
      a light source for generating a light containing three primary color lights,
      a non-spherical reflective mirror having an angle range about $2\pi$ (Steradian unit) from said light source for leading a beam emitted backward from the light source to advance forward in parallel,
      a beam guide unit arranged in front of the light source for allowing the beams in parallel with the optical axis of the condenser member among the beams from sid non-spherical reflective mirror and light source to pass therethrough and having a plurality of cylinders whose radiuses become gradually increased and has an axis-symmetrical structure with the condenser member, and
      a reflective mirror member including a plurality of ringular band-type spherical mirrors having a center of curvature identical to that of the light source for reflecting the beams emitted forward in a ringular band-type toward the light source,
   a first polarizing beam splitter arranged such that parallel beams from said condenser member are incident thereupon perpendicularly for splitting said parallel beams into two polarizing beams having the polarizing directions perpendicular to each other,
   first and second mirrors arranged in slant at 45° with respect to the advancing direction of said two polarizing beams for reflecting said two polarizing beams splitted in perpendicular to each other from said first polarizing beam splitter so as to be crossed with each other,
   a second polarizing beam splitter, a field lens, and a projection lens arranged such that said two polarizing beams reflected at the first mirror and the second mirror, respectively, are added to each other and allowed to pass through said field lens and projection lens, and
   first and second LCD panels arranged between said second polarizing beam splitter and said first and second mirror for allowing said two polarizing beams reflected at the first and second mirrors to pass therethrough, respectively, and for transmitting a liquid crystal display image signal to the projection lens by means of said two polarizing beams.

2. The stereoscopic projector of claim 1, wherein the polarizing beam splitter includes a pair of perpendicular prisms bonded at slant surfaces with each other and provided therebetween with a multilayer dielectric film coated at a Brewster's angle or a polarizing angle with respect to an incident beam so that the incident beam can be splitted into a pair of beams having the polarizing directions perpendicular to each other.

3. A stereoscopic projector comprising:
   a condenser member for leading a beam from a light source to advance in parallel to an optical axis of said condenser member,
   a first polarizing beam splitter arranged such that parallel beams from said condenser member are incident thereupon perpendicularly for splitting said parallel beams into two polarizing beams having the polarizing directions perpendicular to each other,
   a reflective mirror for changing the advancing direction of one polarizing beam out of the two polarizing beams splitted into perpendicular to each other from said polarizing beam splitter so that the advancing direction of two polarizing beams are in parallel with each other, and a pair of LCD panels, a pair of field lenses, and a pair of projection lenses arranged in order in the advancing directions of the two polarizing beams, respectively for transmitting the image signal from the LCD panels to a screen.

4. The stereoscopic projector of claim 3, wherein said condenser member includes:

a light source for generating a light containing three primary color lights, a non-spherical reflective mirror having an angle range about $2\pi$ (Steradian unit) from said light source for leading a beam emitted backward from the light source to advance forward in parallel, a beam guide unit arranged in front of the light source for allowing the beams in parallel with the optical axis of the condenser member among the beams from said non-spherical reflective mirror and light source to pass therethrough and having a plurality of cylinders whose radiuses become gradually increased and has an axis-symmetrical structure with the condenser member, and a reflective mirror member including a plurality of ringular band-type spherical mirrors having a center of curvature identical to that of the light source for reflecting the beams emitted forward in a ringular band-type toward the light source.

5. A stereoscopic projector comprising:

two condenser members for leading beams from two light sources to advance in parallel with the optical axis thereof, a polarizing beam splitter arranged with said two condenser members so that said two parallel beams from said two condenser members are incident upon in perpendicular to each other two adjacent surfaces of said polarizing beam splitter for splitting said two parallel beams into two polarizing beams having the polarizing directions perpendicular to each other, two LCD panels, arranged between the adjacent surfaces of said polarizing beam splitter and the two condenser members for generating stereoscopic image signals, and a field lens and a projection lens for generating a stereoscopic image consisting of two polarizing beams having the polarizing directions perpendicular to each other on a screen by allowing one beam out of the beams having the two stereoscopic image signals emitted from the polarizing beam splitter to pass therethrough.

6. The stereoscopic projector of claim 5, wherein said condenser member includes:

a light source for generating a light containing three primary color lights, a non-spherical reflective mirror having an angle range about $2\pi$ (Steradian unit) said light source for leading a beam emitted backward from the light source to advance forward in parallel, a beam guide unit arranged in front of the light source for allowing the beams in parallel with the optical axis of the condenser member among the beams from said non-spherical reflective mirror and light source to pass therethrough and having a plurality of cylinders whose radiuses become gradually increased and has an axis-symmetrical structure with the condenser member, and a reflective mirror member including a plurality of ringular band-type spherical mirrors having a center of curvature identical to that of the light source for reflecting the beams emitted forward in a ringular band-type toward the light source.

* * * * *